United States Patent [19]

Spitz et al.

[11] Patent Number: 5,563,225
[45] Date of Patent: Oct. 8, 1996

[54] PROCESS FOR THE POLYMERIZATION OF ETHYLENE AND CATALYTIC COMPONENT THEREFOR

[75] Inventors: Roger Spitz, Saint-Symphorien d'Ozon; Jean Malinge, Orthez; Jean-Francois Joly, Chatillon Sous Bagneux, all of France

[73] Assignee: Atochem, France

[21] Appl. No.: 320,053

[22] Filed: Oct. 7, 1994

Related U.S. Application Data

[60] Continuation of Ser. No. 755,878, Sep. 4, 1991, abandoned, which is a division of Ser. No. 436,059, Nov. 13, 1989, Pat. No. 5,151,396.

[30] Foreign Application Priority Data

Nov. 23, 1988 [FR] France ................................. 88 15261

[51] Int. Cl.⁶ ............................................... C08F 4/64
[52] U.S. Cl. ........................ 526/116; 526/114; 526/119; 526/124.2; 526/348.6; 526/352; 502/113
[58] Field of Search ............................ 526/114, 116, 526/119, 124.2

[56] References Cited

U.S. PATENT DOCUMENTS 4,364,851  12/1982  Shiga et al. ............................ 526/125
4,525,554   6/1985  Tanaka et al. .......................... 526/125

*Primary Examiner*—David W. Wu
*Attorney, Agent, or Firm*—John L. Sigalos

[57] ABSTRACT

A catalytic component having controlled structure for use in combination with a cocatalyst for the polymerization of ethylene, and being the product of the process of subjecting a component consisting essentially of titanium, magnesium, and chlorine to a reduction treatment and after such treatment contacting the component with a transition metal chlorine-containing compound and process of polymerizing ethylene using such catalytic component to produce polymers having a broad molecular weight distribution.

2 Claims, No Drawings

PROCESS FOR THE POLYMERIZATION OF ETHYLENE AND CATALYTIC COMPONENT THEREFOR

This application is a continuation, of application Ser. No. 07/755,878, filed Sep. 4, 1991, now abandoned, which is a division of application Ser. No. 07/436,059, filed Nov. 13, 1989, now U.S. Pat. No. 5,151,396.

BACKGROUND OF THE INVENTION

The present invention pertains to a process for the polymerization of ethylene for obtaining a polymer with a broad molecular-weight distribution. Specifically, the objective of the invention is to obtain high and low density linear polyethylene. The result is obtained due to the particular treatment, prior to its use with a cocatalyst in the polymerization of the ethylene, of the catalytic component. Prior to its use, the catalytic component comprising at least one magnesium derivative and a chlorine-containing derivative of titanium mainly at the oxidation state 3 and/or 4 undergoes a reduction by a metallic compound possessing at least one metal-carbon or metal-hydrogen bond, followed by a treatment by a transition metal halogen compound.

The invention also pertains to the process for treating the catalytic component.

As used herein the phrase "polymerization of ethylene" means not only the homopolymerization of the ethylene, but also the copolymerization of the ethylene with an alpha-olefin, such as propylene, 1-butene or 1-hexene.

The polymers with a broad molecular-weight distribution, industrially employed in particular in extrusion-blow molding techniques, are distinguished by their polydispersity and their fluidity index from the polymers with a narrow molecular-weight distribution, industrially employed, in particular, for injection molding.

The polymers with a narrow molecular-weight distribution possess, on an average, a polydispersity of about 4 to 6, the polydispersity being the ratio of the molar weight by weight to the molar weight by number. These polymers with high fluidity posses a fluidity index ratio $MFR_{5-2}$ less than 3.3, $MFR_5$. being, according to the ASTM standard D1238, the $MI_5/MI_2$ ratio of the fluidity index under 5 kg to the fluidity index under 2.16 kg; the $MFR_{21-5}$ ratio of the fluidity indices under 21.6 kg to the fluidity index under 5 Kg, $MI_{21}/MI5$ according to the ASTM standard D 1238, is less than 10. These products are obtained in a single reactor by the polymerization of the ethylene in suspension in solution, or in the gaseous phase in the presence of a specific Ziegler-type catalyst comprising a cocatalyst, in general an alkylaluminum, and a catalytic component containing Ti, Mg, Cl and possibly an electron donor. The products obtained with a narrow distribution possess a limited elasticity which avoids the very negative phenomenon of injection shrinkage.

Due to their lack of elasticity, these products are unsuitable for techniques requiring a high mechanical resistance in the melted state, as, for example, in the case of extrusion-blow molding. When these properties are in demand, one employs polymers with a broad molecular-weight distribution, preferably possessing a fluidity index ratio $MFR_{21-5}$ greater than 16 for a fluidity index $MI_5$ of about 1 to 1.5, or a $MI_5/MI_2$ ratio greater than 3.5 for $MI_2$>1.

The industrial manufacture of these products in a single reactor presents great difficulties in the presence of a Ziegler-type catalyst.

According to Zucchini; U. and G. Cecchin: "Control of Molecular-Weight Distribution in Polyolefins Synthesized with Ziegler-Natta Catalyst Systems," *Adv. in Polymer Science* 51, 101–153 (1983), a document which reflects the prior art in this matter, the best means for obtaining a polymer with a broad molecular-weight distribution in the presence of a Ziegler-type catalyst is to carry out the polymerization in several stages or in a series using at least two successive reactors. However, even under these best conditions, it is not easy to manufacture a polyethylene with a MFR $_{21-5}$ greater than 16, a necessary condition being to proceed with catalysts that yield broad distributions in a single reactor. Moreover, this process presents the disadvantage or requiring at least two reactors which leads to a loss in productivity with regard to the significance of the installation and a delicate control due to the activity of several reactors instead of just one.

According to FR-A-2,596,398, it is possible to obtain, by the polymerization of ethylene in a single reactor, a polymer with a broad molecular-weight distribution with a MFR $MI_{21}/MI_5$ greater than 16. obtain this result, a mixture of $MgCl_2$ and $TiCl_4$ obtained by joint pulverization is employed as the catalytic component. In addition to the joint pulverization of the components, which requires industrially complex rules, the process presents the disadvantage of using a component with a poorly defined structure, which leads to the manufacture of a polymer with a heterogeneous granular distribution.

SUMMARY OF THE INVENTION

The advantage of the process of this invention is that it uses a catalytic component with a controlled structure, capable of manufacturing a polymer with a broad molecular-weight distribution, the $MI_{21}/MI_5$ ratio being greater than 16 and possibly exceeding 25 for products with high molecular weight, in particular for products, the fluidity index $MI_2$ of which is less than 0.5 and the $MI_5/MI_2$ ratio being greater than 3.5. Moreover, the performances of the component obtained according to FR 2,596,398 are improved.

To obtain these results, the ethylene is polymerized in the presence of a catalyst comprising a cocatalyst selected from among the alkylaluminums and of a catalytic component based on at least Mg, Ti and Cl treated under the conditions set forth below.

DETAILED DESCRIPTION

The characteristic of the invention consists, in a first stage, of subjecting the catalytic component to a reducing treatment, then in a second stage, treating the product obtained with a transition metal chlorine-containing compound.

The initial catalytic compound before treatment is a product that is known in itself and is extensively described in the literature. It is usually the result of the combination of at least one titanium compound, one magnesium compound, one chlorine compound and possibly an electron donor or acceptor and any other compound that can be used in these types of components.

The titanium compound is usually selected from among the compounds having the formula $Ti(OR)_xCl_{4-x}$, in which:

(i) R is a $C_1$ to $C_{14}$ aliphatic or aromatic hydrocarbon radical, or $COR^1$ with $R^1$ being a $C_1$ to $C_{14}$ aliphatic or aromatic hydrocarbon radical, and (ii) x is a number from 0 to 3.

The magnesium compound is usually selected from among the compounds having the formula $Mg(OR^2)_n Cl_{2-n}$, in which $R^2$ is hydrogen or a cyclic or linear hydrocarbon radical and n is a number less than or equal to 2.

The chlorine can result directly from the halide of titanium and/or the halide of magnesium, but it can also result from an independent chlorinating agent such as hydrochloric acid or an organic halide such as butyl chloride.

The optional electron donor or acceptor is a liquid or solid organic compound known for entering into the composition of these catalytic components. The electron donor can be a mono- or polyfunctional compound advantageously selected from among aliphatic or aromatic carboxylic acids and their alkyl esters, aliphatic or cyclic ethers, ketones, vinyl esters, acrylic derivatives, in particular alkyl acrylates or methacrylates and silanes. Compounds such as methyl paratoluate, ethyl benzoate, ethyl or butyl acetate, ethyl ether, ethyl paraanisate, dibutylphthalate, dioctylphthalate, diisobutylphthalate, tetrahydrofuran, dioxane, acetone, methyl isobutyl ketone, vinyl acetate, methyl methacrylate and silanes such as phenylteiethoxysilane, aromatic or aliphatic alkoxysilanes are especially suitable as electron donors.

The electron acceptor is a Lewis acid preferably selected from among aluminum chlorides, boron trifluoride, chloranil or alkylaluminums and alkylmagnesiums.

The catalytic component is used in the form of a complex of at least Mg, Ti, Cl, the chlorinated titanium being mainly in the form of $Ti^{IV}$, $Ti^{III}$ or a mixture of both, optionally with an electron donor or acceptor. The catalytic component can be in the form of a complex, but also in the form of a deposit on a mineral support such as $SiO_2$ or $Al_2O_3$ or an organic support, for example, of the polymer type.

In a first stage, the catalytic component as defined above is treated with a reducing agent. It involves a compound that is gaseous, liquid or soluble in hydrocarbons, capable, as it is generally known in chemistry, or reducing the degree of oxidation of the $Ti^{IV}$ and/or $Ti^{III}$. The reducing agent employed is preferably a metallic compound possessing at least one metal-carbon or metal-hydrogen bond. The metallic usually selected from among the compounds $MQ_y Cl_{z-y}$, M compounds possessing at least one metal-carbon bond are being a metal of groups I, II and III of the Periodic Table, and more particularly, Al and Mg; Q being a cyclic or linear hydrocarbon radical, z being a number corresponding to the maximum valence of the metal; and y being a number less than or equal to z. Also included in the definition of these compounds are the addition products of these compounds between themselves such as, for examples: $NaAl(C_2H_5)_4$ or the products obtained by bridging two metallic compounds defined above by an oxygen such as, for example, aluminoxanes and aluminosiloxanes. Among these metallic compounds, one prefers aluminoxanes, aluminosiloxanes, dialkylmagnesiums and alkylaluminums of the type $Al(R^3)_c X_d$ where (i) X is Cl, and (ii) $R^3$ represents a $C_1$ to $C_{14}$ saturated hydrocarbon radical, or $(OR_4)$ with $R^4$ which is a $C_1$ to $C_{14}$ saturated hydrocarbon radical with $0 \leq d \leq 1.5$ and $c+d=3$.

$Al(C_2H_5)_3$, $Al(C_2H_5)_2Cl$, $Al(C_4H_9)_3$, $Al_2(C_2H_5)_3 Cl_3$, $Al(C_6H_{13})_3$, $Al(C_8H_{17})_3$ and $Al(C_2H_5)_2(OC_2H_5)$ can be cited as examples.

The metallic compounds possessing at least one metal hydrogen bond are usually selected from among the compounds $MQ'_c X_d H_3$ where M is a metal as defined above, Q' is a cyclic or linear hydrocarbon radical, X is Cl or is selected from among the preceding Q' radicals with $0 \leq d \leq 1.5$, $1 \leq e \leq z$ and $c+d+e=z$, z corresponding to the maximum valence of M. Hydrides such as $Al(C_4H_9)_2H$, $Al(C_2H_5)_2H$, $(C_2H_5)_4 B_2 H_2$ and mixed hydrides such as aluminum-lithium, $AlLiH_4$, can be cited among these compounds. The combination of the hydrides with one another or with the organometallic compounds defined above is obviously possible.

In this stage, the component is treated under an inert atmosphere with the reducing agent, as is, or in the presence of a diluent both as solvent of the reducing agent and inert to it as well as to the component. The hydrocarbons among others are suitable for this application. Even though the reaction temperature is not critical, for reasons of reasonable reaction duration, the reduction is preferably carried out from ambient temperature to 150° C. under atmospheric pressure or under pressure, preferably between 40° and 100° C. under atmospheric pressure for reaction durations of about ten minutes to 24 hours.

The reduction reaction is stopped when at least 50% by weight of the initial titanium has its degree of oxidation reduced by at least one unit, for example, when 50% of the $Ti^{IV}$ is reduced to $Ti^{III}$ or 50% of the $Ti^{III}$ is reduced to $Ti^{II}$. However, it is preferable to continue the reduction of titanium as much as possible, but it is recommended to stop the reduction when the mean degree of reduction of the titanium is closest to II. In this reduction stage, the molar ratio of reducing-agent metal to titanium is preferably greater than two and especially between 10 and 50.

The reduction reaction is stopped by cooling and washing the product obtained, preferably with a hydrocarbon, to eliminate the excess reducing agent. The resulting product can be dried.

In the second stage, the reduced product obtained is treated with a transition metal chlorine-containing compound. This chlorine-containing compound is most often a chloride, an alkoxychloride or an oxychloride of a transition metal selected from among titanium, vanadium, chromium, zirconium such as, for example, $TiCl_4$ or $VCl_4$. To facilitate the chlorination reaction, it is preferable to employ a chlorine-containing compound that is liquid or is soluble in a solvent that is inert to the products brought into contact. The treatment is carried out by bringing into contact, in an inert atmosphere, the reduced product of the first stage with the chlorine-containing compound. The contact temperature, once again, is not critical. For practical reasons, it is recommended to treat the products in contact at a temperature ranging between the ambient temperature and 150° C. and preferably between 60° and 100° C. for treatment durations ranging between several minutes and four hours. The amount of transition-metal chlorine-containing compound used is preferably at least half of the stoichiometry, especially close to the stoichimetry or in excess with regard to the titanium content of the product obtained at the end of the first stage. After treatment, the component is finally recovered under an inert atmosphere after washing and optionally drying.

The catalytic component obtained after these two treatment stages is employed in the classical manner with a commonly known cocatalyst, generally selected from among the alkylaluminums, in the suspension or gaseous-phase polymerization processes of olefins.

In a suspension polymerization process of ethylene, one operates in the usual manner in a liquid hydrocarbon medium at temperatures capable of reaching up to 120° C. and under pressures capable of reaching up to 250 bars.

The gaseous-phase polymerization of ethylene in the presence of hydrogen and inert gas can be carried out in any reactor capable of gaseous-phase polymerization and in particular in an agitated-bed or fluidized-bed reactor. The implementation conditions are known from the prior art and are conventional. One generally operates at a temperature lower than the melting point Tf of the polymer or copolymer to be synthesized and more particularly between 20° C. and (Tf −5° C.) and under a pressure such that the ethylene and possibly the other hydrocarbon monomers present in the reactor are essentially in vapor phase.

The polymerization can be carried out in two stages. In a first stage, it is possible to consolidate the catalytic system by carrying out a prepolymerization based on ethylene in the presence of the constituents of the catalytic system and a cocatalyst, then in a second stage, by continuing the polymerization by adding ethylene or a mixture of ethylene and an alpha-olefin such as mentioned above. The prepolymerization stage produces a polymer formation not exceeding 10% by weight of the total polymer becoming formed. This prepolymerization stage is carried out in suspension in the presence of a hydrocarbon diluent, in the gaseous phase or in a combination of suspension and gaseous phase.

The invention will be further described in connection with the following examples which are set forth for purposes of illustration only.

EXAMPLE 1 a) Preparation of the Catalytic Component 8.3 g of anhydrous $MgCl_2$ are pulverized for six hours; 0.7 mL of $TiCl_4$ is added and the mixture is pulverized for four hours. The solid recovered is extracted from the pulverization bowl with heptane and dried under vacuum. A product A containing 3% by weight of titanium is obtained. Four grams of A are treated in heptane with triethylaluminum at the concentration of 0.85 M/l (Al/Ti=14) for three hours at 80° C. The solid obtained is rinsed three times, protected from air, with 50 ml of heptane and is dried under vacuum. The product recovered is brought into contact, protected from air, with 40 ml of $TiCl_4$ for four hours at 100° C. After five washings with heptane, the solid obtained is dried under vaccum. A solid B containing 4.4% by weight of titanium and 0.9% by weight of aluminum is obtained.

b) Polymerization of Ethylene in Suspension

The catalytic component B is used for the polymerization of ethylene in suspension. In a stainless steel 2.5-liter reactor provided with agitation by a blade turning at 650 rpm, one introduces in the following order at ambient temperature under an inert atmosphere: one liter of heptane, trihexylaluminum (3 mM) and the catalytic component B in an amount corresponding to 2.5 mg of Ti.

Hydrogen is added up to a partial pressure of 4.3 bars (test 1) and 5 bars (test 2), and one completes 10 with the ethylene by adjusting the pressure to reach 9 bars absolute of total pressure after heating at 80° C. This total pressure is kept constant for one hour by adding ethylene.

After one hour, one stops the injection of ethylene, one cools at ambient temperature, the catalyst is deactivated by adding a methanol solution slightly acidified by 10% hydrochloric acid. The polymer suspension is filtered and then dried.

By way of comparison, test 1 is repeated with the product A.

The results obtained on the final polymer are follows:

| Component | TEST | Productivity in g of PE/g of component | $MI_5$ | $MI_{21}$ | $MI_{21}/MI_5$ | $MI_5/MI_2$ |
|---|---|---|---|---|---|---|
| B | 1 | 2,800 | 0.5 | 13 | 26 | NS |
| A | 1 comparison | 775 | 0.87 | 14.2 | 16.3 | NS |
| B | 2 | 1,500 | 4.3 | NS | NS | 5 |

NS = not significant. Either $I_2$ is too low to be measured or $I_{21}$ is too high to be measured correctly.

EXAMPLE 2 a) Preparation of the Catalytic Component

The component C is prepared under the conditions for obtaining the component A in Example 1, except for the duration of joint pulverization which is eight hours.

Amount of anhydrous $MgCl_2$: 10 g

Amount of $TiCl_4$: 0.66 ml

A product C containing 2.5% by weight of titanium is obtained.

On the one hand: 3.6 g of solid C are treated in heptane with $ClAl(C_2H_5)_2$ at the concentration of 0.7 M/l (Al/Ti= 17.7) for two hours at 80° C. After four washings each with 60 ml of heptane protected from air, the solid is brought into contact with 30 ml of $TiCl_4$ for two hours at 100° C. After washings with heptane and drying under vacuum, the solid D containing 3.8% by weight of titanium and 0.8% by weight of aluminum is obtained.

On the other hand: 3 g of solid C are treated in heptane with triethylaluminum at the concentration of 1.2M/l (Al/ Ti=15) for two hours at 80° C. After washings with heptane and drying under vacuum, the solid is brought into contact with 30 ml of $TiCl_4$ for two hours at 100° C. After washings with heptane and drying under vacuum, the solid E containing 11.5% by weight of titanium and 1.5% by weight of aluminum is obtained.

b) Polymerization of Ethylene in Suspension

The components D, E and C, by way of comparison, are each used in the homopolymerization of ethylene under the condition in Example 1 except that pertaining to the hydrogen pressures.

The results obtained for the final polymer are as follows:

| Component | H2 pressure in bars | Productivity in g of PE/G of component | $MI_5$ | $MI_{21}$ | $MI_{21}/MI_5$ |
|---|---|---|---|---|---|
| D | 4.3 | 2,500 | 0.77 | 18 | 23.4 |
| E | 4 | 1,100 | 0.60 | 13 | 21.7 |
| C | 4.3 | 2,500 | 1.33 | 22.8 | 17 |

EXAMPLE 3 a) Preparation of the Catalytic Component 10 g of anhydrous $MgCl_2$ and 1.15 ml of $TiCl_4$ are treated under the condition of Example 1, except for the duration of joint pulverization which is 16 hours.

The product obtained is treated in heptane with triethylaluminum at the concentration of 0.5 M/l (Al/Ti =2) for two hours at 90° C. After washing with heptane, the solid is treated with 1.5 ml of $VCl_4$ for 30 minutes at 80° C. After washing with heptane and then drying under vacuum, a solid F containing 3.7% by weight of Ti, 4.4% by weight of V and 1.72% by weight of Al is obtained.

b) Copolymerization of Ethylene and 1-Butene in Vapor Phase

For the vapor-phase polymerization, one employs a stainless-steel 2.5 liter, spherical reactor, provided with agitation by a blade turning at 250 rpm. The temperature is regulated at 85° C. At 85° C., one introduces into the reactor the reagents in the following order: trihexylaluminum (0.7 mM), butene up to a partial pressure of 1.8 bars, ethylene 8.2 bars and hydrogen 2 bars.

The component F, in an amount corresponding to 2.5 mg of Ti, is injected into the reactor, the total pressure (12 bars) is kept constant by continuously adding an ethylene-butene mixture with 3.7 mol % butene. After one hour of reacting, the reactor is degassed and cooled; one recovers a polymer powder with a composition of 17.8 ethyl branchings per 1,000 carbons. The other characteristics are as follows:

| Component | Productivity in g of polyethylene per g of component | $MI_2$ | $MI_5/MI_2$ |
| --- | --- | --- | --- |
| F | 3,000 | 1.54 | 4.9 |

EXAMPLE 4 a) Copolymerization of Ethylene and 1-Butene in Vapor Phase

The component E of Example 2 is used in the copolymerization of ethylene and butene under the same conditions as in Example 3, except for the partial pressure of hydrogen 7.5 bars, partial pressure of butene 0.8 bar and partial pressure of ethylene 4.2 bars. The temperature is regulated at 65° C. and the composition of the ethylene-butene gaseous mixture feeding the reactor is 3.54 mol % of butene.

By way of comparison, the test with the component C is repeated:

| Component | Productivity in g of polyethylene per g of component | $MI_2$ | $MI_{21}/MI_2$ |
| --- | --- | --- | --- |
| E | 1,500 | 1 | 65 |
| C | 2,000 | 1.8 | 35 |

EXAMPLE 5

A solution of dibutylmagnesium 0.5 M/l, tetraisobutyaluminoxane 0.015 M/l and disecbutyl ether (EDSE) 0.03 M/l is introduced into a reactor under inert atmosphere. This solution is maintained under agitation at 50° C. for about 16 hours. One then slowly adds into the reactor a mixture of tertiobutyl chloride (tBuCl) in an amount such that the tBuCl/l Mg weight ratio=3 and disecbutyl ether in an amount such that the EDSB/Mg weight ratio=0.6 at the end of the addition. The temperature and the agitation are maintained for three hours. The solid obtained is filtered and washed with hexane and then returned to suspension in hexane. Anhydrous HCl is bubbled for 30 minutes at ambient temperature. After washing and filtration, the solid is returned to suspension in $TiCl_4$ and maintained at 90° C. for two hours. After filtration, washing and drying under inert atmosphere, a component G with spherical morphology containing 3.1% by weight of titanium is obtained.

The catalytic component G is treated in heptane with triethylaluminum at the concentration of 600 mM/l, with an Al/Ti molar ratio=23, for one hour at 60° C. After washing with heptane and drying in an inert medium, the intermediate solid obtained is treated with $TiCl_4$ at 90° C. for two hours. After washing and drying in an inert medium, the component H obtained has preserved its spherical morphology and possesses a titanium content of 7.3% by weight.

b. Polymerization of Ethylene in Suspension

The component H is used in the polymerization of ethylene in suspension under the conditions of Example 1 except for the cocatalyst: triisobutylaluminum 2.5 mM/l, diluent: hexane, temperature: 75° C., partial pressure of hydrogen: 4.2 bars: partial pressure of ethylene: 6.4 bars: and duration of the polymerization: three hours.

By way of comparison, the test with the component G is repeated. The results obtained are as follows:

| Component | Productivity in g of PE/G of component | $MI_5$ | $MI_{21}$ | $MI_{21}/MI_5$ | $MV_A$ |
| --- | --- | --- | --- | --- | --- |
| G | 12,000 | 1.2 | 14.1 | 11.7 | 0.4 |
| H | 17,000 | 1 | 24 | 24 | 0.42 |

EXAMPLE 6 a) Preparation of the Catalytic Component

The catalytic component G is treated in heptane with dibutylmagnesium 150 mM/l, with a Mg/Ti molar ratio=5, for two hours at 80° C. After washing and siphoning the solvent, the intermediate solid is treated with $TiCl_4$ at 90° C. for two hours. The component I obtained after washing and drying has preserved a spherical morphology and contains 3.9% by weight of titanium.

b) Polymerization of Ethylene in Suspension

The catalytic component I is used in the polymerization of ethylene under the conditions of Example 5. By way of comparison the results obtained with component G are repeated.

| Component | Productivity in g of PE/g of component | $MI_5$ | $MI_{21}$ | $MI_{21}/MI_5$ | $MV_A$ |
| --- | --- | --- | --- | --- | --- |
| G | 12,000 | 1.2 | 14.1 | 11.7 | 0.4 |
| I | 17,900 | 1.3 | 22.8 | 17.5 | 0.4 |

EXAMPLE 7 a) Preparation of the Catalytic Component

The catalytic component J is prepared in a similar manner to the catalytic component G in Example 5. The component J has a spherical morphology and contains 1.6% by weight of titanium.

The catalytic component J is treated in heptane with diethylaluminum hydride at the concentration of 80 mM/l and an Al/Ti molar ratio=2.5 for two hours at 80° C. After washing and siphoning the solvent, the intermediate solid is treated with $TiCl_4$ at 90° C. for two hours. The component K obtained after washing and drying possesses the following characteristics: Ti=5.7% by weight and spherical morphology.

b) Polymerization of Ethylene in Suspension

The components J and K are used in the polymerization of ethylene under the conditions of Example 5.

| Component | Productivity of g of PE/g of component | $MI_5$ | $MI_{21}$ | $MI_{21}/MI_5$ | $MV_A$ |
|---|---|---|---|---|---|
| J | 17,700 | 1.15 | 13.2 | 11.4 | 0.42 |
| K | 26,400 | 0.48 | 7.8 | 16.2 | 0.4 |

While the invention has been described in connection with a preferred embodiment, it is not intended to limit the scope of the invention to the particular form to set forth, but on the contrary, it is intended to cover such alternatives, modifications, and equivalents as may be included within the spirit and scope of the invention as defined by the appended claims.

What is claimed is:

1. A process for the homopolymerization of ethylene or the copolymerization of ethylene with an alpha-olefin, in suspension or in the gaseous phase, to form a polymer having a broad molecular weight distribution, a $MI_{21}/MI_5$ ratio greater than 16, $MI_z$ less than 0.5, and a $MIS/MI_2$ ratio greater than 3.5, comprising carrying out the polymerization in the presence of a catalyst comprising a cocatalyst and a catalytic component, said catalytic component prepared by combining a chlorinated titanium compound mainly at the oxidation state of 3 and/or 4 and having the formula:

$Ti(OR)_xCl_{4-x}'$ in which:

(i) R is a $C_1$ to $C_{14}$ aliphatic or aromatic hydrocarbon radical, or $COR^1$ with $R^1$ being a $C_1$ to $C_{14}$ aliphatic or aromatic hydrocarbon radial, and (ii) x is a number from 0 to 3, a magnesium compound and a chlorine compound, treating said solid component with a reducing agent capable of reducing the degree of oxidation of $Ti^4$ and/or $Ti^3$ and after such treatment contacting the component with a chlorine-containing transition metal compound consisting essentially of a chloride, an alkoxychloride or an oxychloride of a transition metal which is titanium, vanadium, chromium or zirconium.

2. The process of claim 1 wherein the cocatalyst is an alkylaluminum compound.

* * * * *

UNITED STATES PATENT AND TRADEMARK OFFICE
CERTIFICATE OF CORRECTION

PATENT NO. : 5,563,225
DATED : October 8, 1996
INVENTOR(S) : Spitz et al.

It is certified that error appears in the above-indentified patent and that said Letters Patent is hereby corrected as shown below:

Column 9, last line, correct "$MI_z$" to read --$MI_2$--;

Column 9, last line, correct "$MIS/MI_2$" to read --$MI_5/MI_2$--;

Signed and Sealed this

Twenty-first Day of January, 1997

BRUCE LEHMAN

Attest:

Attesting Officer

Commissioner of Patents and Trademarks